Oct. 20, 1931. V. DUER ET AL 1,828,650
REGULATING DEVICE FOR ENGINES
Filed Aug. 17, 1928  2 Sheets-Sheet 1
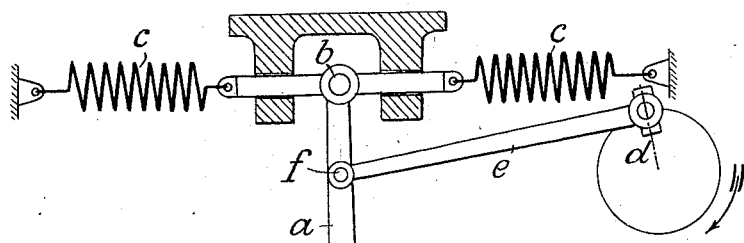
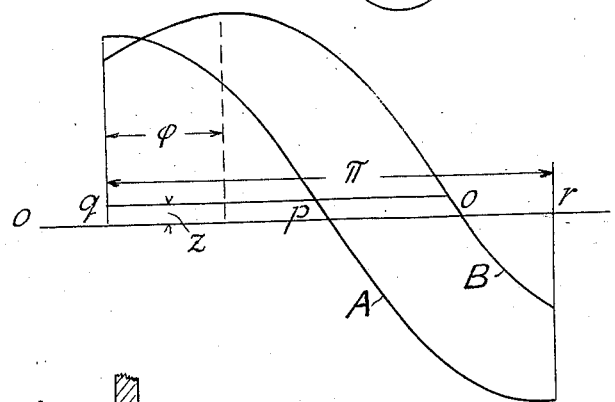
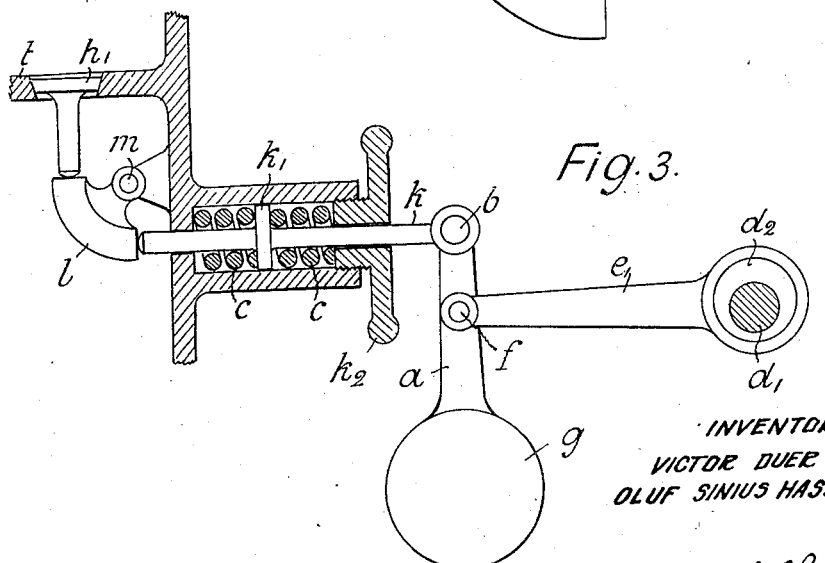
INVENTORS.
VICTOR DUER AND
OLUF SINIUS HASSING.

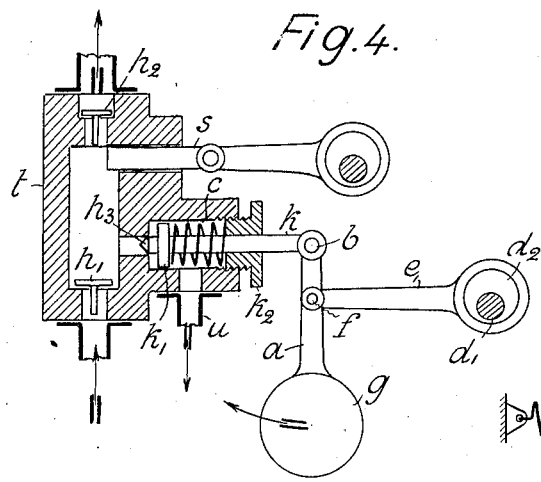
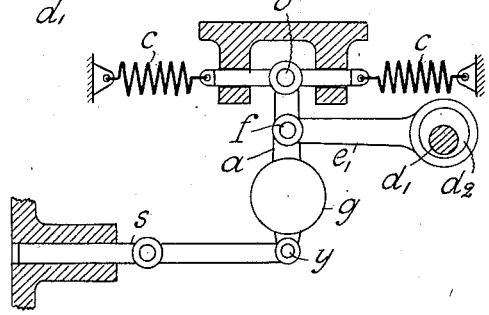
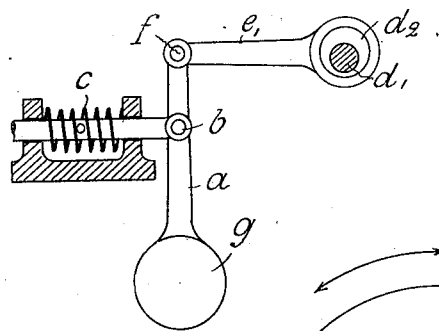
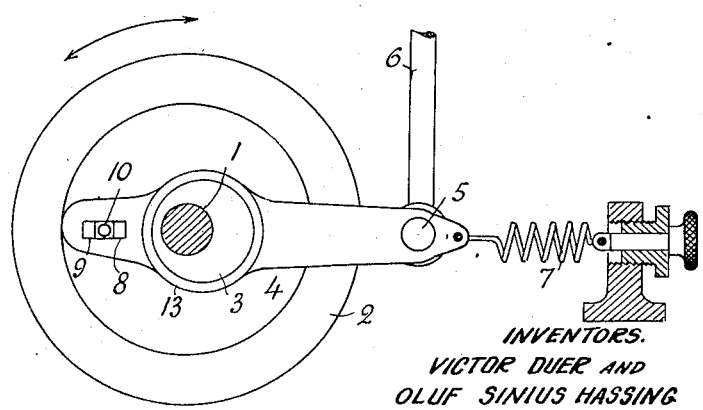
INVENTORS.
VICTOR DUER AND
OLUF SINIUS HASSING Patented Oct. 20, 1931

1,828,650

UNITED STATES PATENT OFFICE

VICTOR DUER AND OLUF SINIUS HASSING, OF COPENHAGEN, DENMARK; SAID HASSING ASSIGNOR TO SAID DUER

REGULATING DEVICE FOR ENGINES

Application filed August 17, 1928, Serial No. 300,358, and in Denmark July 25, 1927.

This invention relates to a regulating device for engines, according to which a periodical motion is transmitted into another periodical motion in regulating purposes. According to the invention a pendulum or another oscillatory system with a definite proper frequency is utilized, the point of suspension or centre of oscillations of which is movable, its motion being bound to a suitable path and restrained or damped by suitable damping means, one point of the said pendulum or system being positively controlled by the motion to be regulated, while another point of the pendulum or system is connected with means influencing regulating means e. g. valves, fuel pumps or the like, by which the number of revolutions of the engine is regulated by varying loads. The pendulum or the like is preferably put under the action of one or more springs, air or liquid brakes or the like, so that the motion of its point of suspension or centre of oscillations is restrained or damped to a suitable degree. Furthermore the point of suspension or centre of oscillations is controlled preferably in a straight or curved path. The pendulum or the like may be prolonged beyond its point of suspension or centre of oscillations, in which case it may be influenced from the rotating shaft from which the motion is transmitted, in a suitable point of its prolonged part. The tension of the spring or springs influencing the pendulum or system may be adjustable, which may also be the case with the number of proper oscillations of the latter, the swinging mass of a common pendulum e. g. being adjustably arranged in a known manner on the pendulum lever, where such a pendulum is in question.

The point of suspension or centre of oscillations of the pendulum or of the system is connected, as above said, with suitable members, e. g. rods, serving to influence regulating means, e. g. valves, fuel pumps or the like, by which the number of revolutions of the motor or other engine driving the said rotating shaft is adjusted by varying loads. These regulating means need not, however, necessarily be influenced from the point of suspension, but may be connected with the pendulum or the like at a suitable point or at suitable points thereof. The invention is illustrated in the drawings, where Fig. 1 is a diagrammatical elevation of a constructional form of the transmission employed by the invention, in order to show its principle, Fig. 2 is a graphical illustration of the motion of the point of suspension as a function of the angular motions of the driving crank, Fig. 3 is a partly sectional elevation of the device in combination with a valve, the opening of which it regulates, Figs. 4 and 5 are diagrammatic sectional elevations of two other constructional forms of the invention combined with various regulating devices, Fig. 6 shows a modification of the pendulum device proper, and Fig. 7 shows a constructional form of the transmission similarly to the balance of a watch. Referring to Fig. 1 the pendulum $a$ is suspended so as to oscillate freely about the point $b$ which is guided in a horizontal path and influenced by two springs $c$ trying to keep it in its central position represented in the drawings. From a rotating shaft the pendulum is put into an oscillating motion by a crank $d$ and a connecting rod $e$ engaging the pendulum at a point $f$. The oscillating mass of the pendulum is designated with $g$. When the number of revolutions of the crank $d$ and thus the number of oscillations of the point $f$ is near the number of proper oscillations of the pendulum the influence of power in point $b$ will be small and the motion to and fro of the point $b$ will, therefore, also be small. The motions of points $f$ and $b$ under such circumstances are almost in one and the same phase. If the number of revolutions of the crank $d$ is increased essentially above the number of proper oscillations of the pendulum the amplitude of the point $b$ will increase, while the amplitude of the oscillating mass $g$ will decrease correspondingly owing to the inertia of the mass. Simultaneously with the increasing of the amplitude of point $b$ the motions of point $f$ and $b$ are displaced relatively to each other as to their phases. The curves A and B shown in Fig. 2 represent the motion of point $b$, ordinates indicating the travel of this point versus the angular motions of the crank $d$ constituting the abscissa. The shown parts of the curves A and B correspond to one half revolution of the crank $d$. The number of revolutions per unit time for which the curves A and B are plotted are slightly above the natural frequency of the pendulum, the number of revolutions corresponding to curve B being higher than that corresponding to curve A. In the diagram this difference is evident through the displacement of B relative to A by an angle $\varphi$. At the distance $z$ from the line O representing the central position of point $b$ is drawn a line $q$—$o$. The distance $z$ corresponds to a certain lost motion of point $b$ from its central position, before it actuates the regulating member to the actuation of which the device according to the invention serves. The intersecting point between line $q$—$o$ and curve A indicates the moment when such an influence ends at the number of revolutions corresponding to curve A, while the intersecting point $o$ of the line $q$—$o$ and curve B represents the moment when the influence ends at the number of revolutions corresponding to curve B. In this case the influence thus lasts as much longer as corresponds to the line $p$—$o$. $\varphi$ indicates the difference in phase. The regulating device in question may e. g. be constructed as shown in Fig. 3. Here the pendulum $a$ is moved from a shaft $d_1$ by an eccentric $d_2$ and a connecting rod $e_1$ engaging the pendulum in point $f$. With the point of suspension $b$ of the pendulum is connected a sliding rod $k$ influenced by two springs $c$ abutting against a disc $k_1$ on the rod $k$. The tension of the springs may be altered, also when running, by turning a threaded bushing $k_2$. Through a bow piece $l$ rotatable around a pivot $m$ the rod $k$ acts upon the suction valve $h_1$ of the fuel pump $t$ of a combustion engine the number of revolutions of which is to be regulated. The valve H' is of the usual type which opens automatically during the suction stroke of the pump piston and in addition, according to the invention, it is pushed and maintained open by the member $l$ under the control of the pendulum device for a period during the compression stroke of the piston, at the normal speed of the engine. However, if the engine speed varies from normal, the regulating effect of the pendulum device causes such change in the movement of the member $l$ with respect to the pump piston as to delay or advance the moments of opening or closing of the valve in order to restore the speed of the engine to normal. It is known per se to regulate the number of rotations of a combustion engine by means of the suction valve of the fuel pump, the suction valve being held open by a centrifugal regulator during the first part of the pressure stroke of the fuel pump, while it is closed during the last part of the stroke, so that the pressure stroke is thus divided up into an inactive and an active part. During the inactive part of the stroke the oil returns through the open suction valve, while during the active part of the stroke it is pressed up to the fuel valve. The moment when the valve is closed is determined according to the invention by an oscillating device contrary to the relatively stationary centrifugal regulator. Corresponding to Fig. 2 the suction valve is kept open until the moments $p$ and $o$ respectively by the two different speeds corresponding to the two curves A and B respectively. At the speed corresponding to curve B the inactive part of the pressure stroke of the fuel pump is augmented by the time $p$—$o$ (in relation to what is the case by the speed corresponding to curve A), so that the quantity of oil pumped into the engine has been diminished, whereby again the engine is made to run slower. In the constructional form shown in Fig. 4, where $s$ is the pump piston of the fuel pump $t$ and $h_1$, $h_2$ are the suction and pressure valves respectively, a needle valve $h_3$ is located in the pressure compartment of the pump closing a return pipe $u$. The needle valve $h_3$ is connected with the sliding rod $k$ driven from point $b$ and is under the influence of a spring $c$ abutting against the disc $k_1$, the tension of which may be varied by the threaded bushing $k_2$. If the number of revolutions of the engine exceeds the normal one, the increased motion to and fro of point $b$ keeps the valve $h_3$ open for a longer time during each pump stroke, so that the injected quantity of oil is diminished, whereby the number of revolutions of the engine is regulated. In the constructional form shown in Fig. 5 the adjustment is carried out thereby that the piston $s$ of the fuel pump is connected with a point $y$ near the oscillating mass $g$ of the pendulum. By an increased speed of the engine the motion (amplitude) of point $y$ is diminished together with the length of the piston stroke, so as to diminish the injected fuel quantity. In the constructional form represented in Fig. 6 the pendulum $a$ is prolonged beyond its point of suspension $b$ and influenced by the shaft $d_1$ at a point $f$ of its prolongation. Instead of a pendulum, other oscillating systems in which the oscillations take place in a horizontal plane or in a plane having any oblique position may be employed to transmit the motion. By way of example Fig. 7 shows a kind of balance. On the shaft 1, the speed of which is to be regulated, is a loose fly wheel 2. The shaft 1 also carries an eccentric disc with an eccentric hoop 13 carrying a two-armed lever 4, one end of which is attached in point 5 (corresponding to the point of suspension of the pendulum) by a rod 6 leading to the regulating member, and by a spring 7 with variable tension. Instead of or beside this spring may be an air or liquid brake. The other end of the lever 4 has a recess 8 engaged by a sliding block 9 rotatably mounted on a tap 10 secured to the fly wheel. This construction is fully analogous to the pendulum constructions specified above, the oscillatory momentum of the fly wheel 2 replacing here the oscillatory mass of the pendulum. In relation to the pendulum device it is, however, to be preferred especially in ship's machineries because it is not influenced by the rolling of the ship because it swings always about its own centre of gravity. The invention is not limited to the constructional forms shown and specified, which are only to be taken as examples.

We claim:

1. A regulating device including an oscillatory pendulum-like member, movable fulcrum means suspending said member for oscillatory movement, means biasing said fulcrum means to a normal position, a motion transmitting member connected to one point of the pendulum-like member and adapted for connection with the device to be regulated, and a regulating member connected to another point of the pendulum-like member.

2. A regulating device including an oscillatory pendulum-like member, movable fulcrum means suspending said pendulum-like member for oscillatory movement, a guide member connected with the pendulum-like member and constituting in part the means movably suspending said member, adjustable means biasing the fulcrum means to a normal position, and a regulating member connected with the guide member.

3. A regulating device for engines including an oscillatory pendulum-like member, movable fulcrum means suspending said pendulum-like member for oscillatory movement, a guide member connected with the pendulum-like member and constituting in part the means movably suspending said member, adjustable means biasing the fulcrum means to a normal position, regulating means associated with the guide member and including an engine valve.

In testimony whereof we affix our signatures.

VICTOR DUER.
OLUF SINIUS HASSING.